Nov. 28, 1950   W. J. REID   2,531,530
SYNCHRONOUS MOTOR
Filed Dec. 12, 1947   2 Sheets-Sheet 1
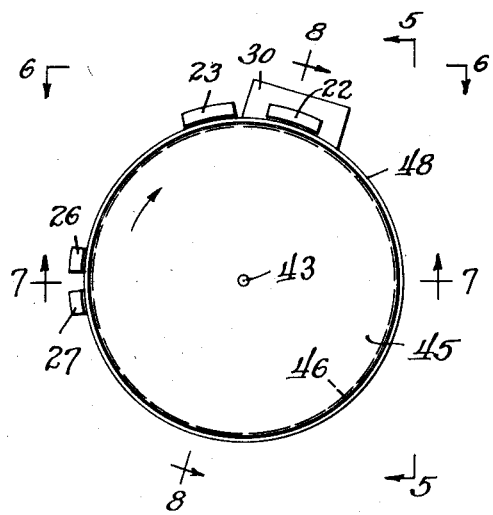
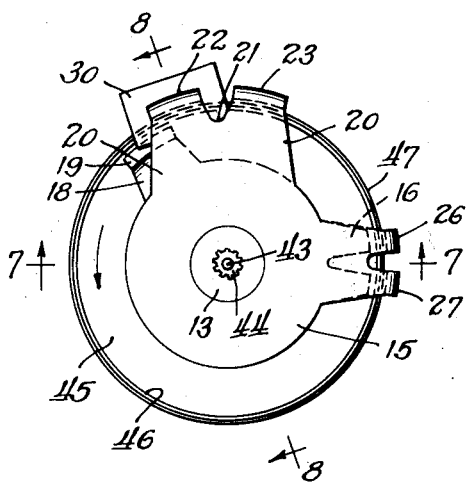
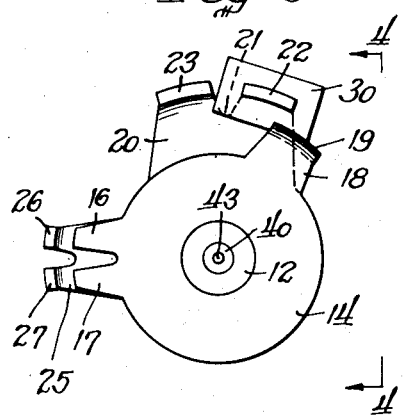
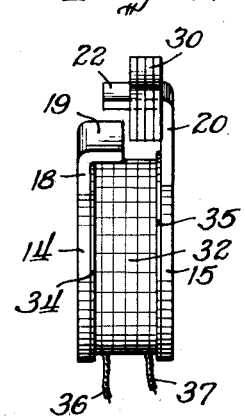
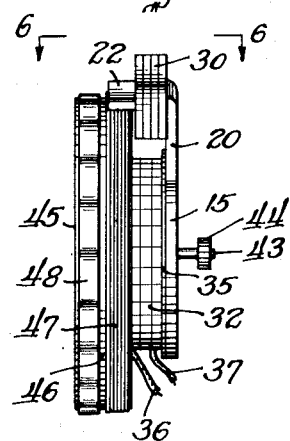
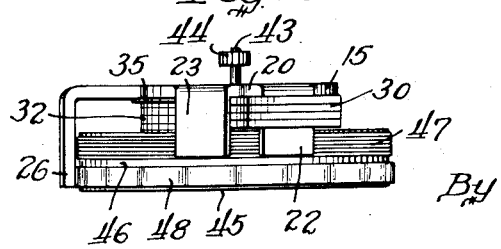
Inventor.
Willard J. Reid Nov. 28, 1950    W. J. REID    2,531,530
SYNCHRONOUS MOTOR
Filed Dec. 12, 1947    2 Sheets-Sheet 2
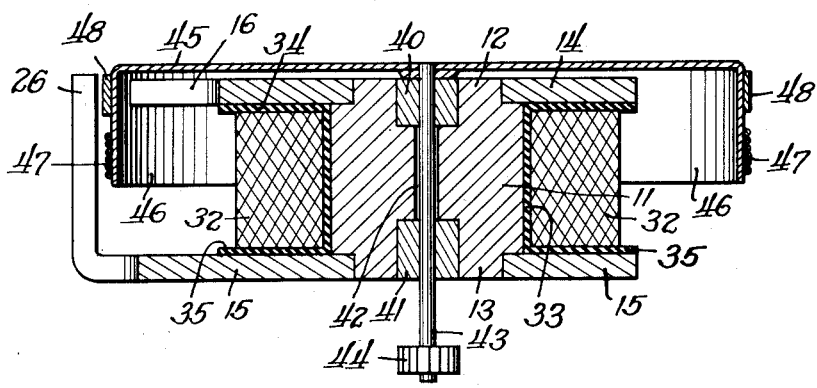
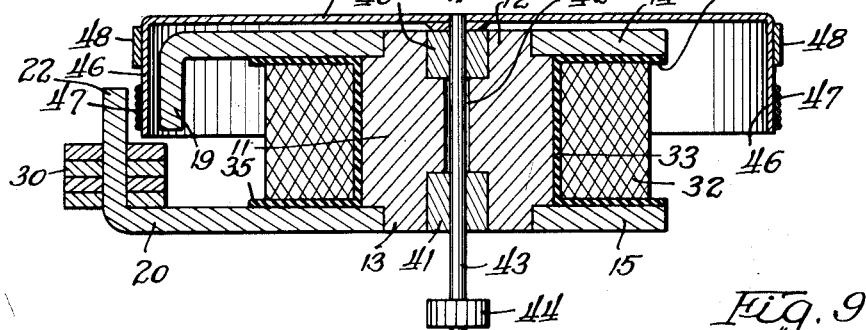
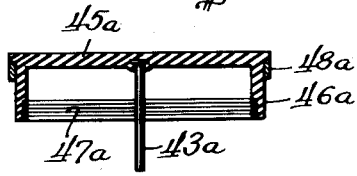
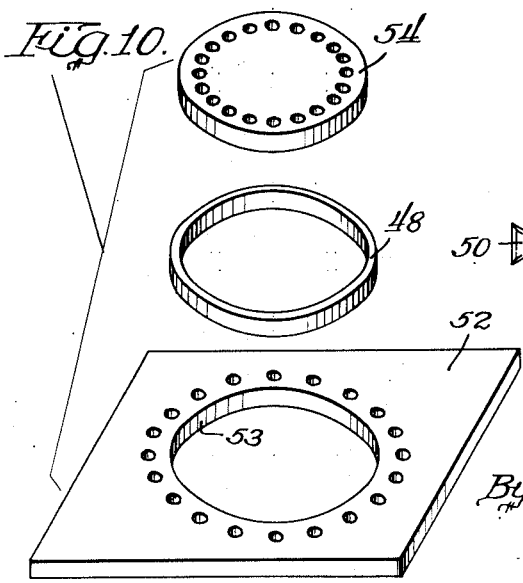
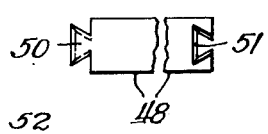
Inventor
Willard J. Reid Patented Nov. 28, 1950

2,531,530

UNITED STATES PATENT OFFICE 2,531,530

SYNCHRONOUS MOTOR

Willard J. Reid, Genoa, Ill.

Application December 12, 1947, Serial No. 791,422

9 Claims. (Cl. 172—278)

This invention relates to synchronous motors, and is particularly concerned with a slow-speed self-starting synchronous motor suitable for use in driving numerous devices including timing devices such, for example, as electric clocks.

An object of the invention is to provide a synchronous motor comprising field means forming a plurality of axially extending outer pole pieces disposed on a common radius and field means forming a plurality of pole pieces disposed on a common radius radially spaced from the outer pole pieces, together with a circular rotor disposed for rotation within the space between said inner and outer pole pieces.

Another object is to provide a synchronous motor having a field means comprising two distinct groups of salient pole pieces, one for starting the rotor and the other for locking it at synchronous speed.

Still another object is to provide a synchronous motor of the indicated type which comprises a rotor carrying two distinct armatures, namely, an armature for starting the motor and an armature for locking the rotor at synchronous speed. These armatures will be referred to as "starting" or as "hysteresis" armature and as "synchronizing" armature, respectively.

A further object is to provide a rotor for a synchronous motor carrying a synchronizing armature made of material of high magnetic retentivity which is magnetized to form a predetermined number of permanent magnets or poles, the number of such magnets or poles determining the synchronous speed of said motor.

Another object is to provide a rotor for a synchronous motor carrying a starting or hysteresis armature formed of hardened steel wire placed on the rotor body side by side in the manner of a tightly wound coil.

Other objects are concerned with the provision of a simplified field pole or stator structure comprising a pair of members of magnetic material assembled with the core of the field magnet and forming a plurality of salient pole pieces one of which is shaded for magnetic coaction with the starting or hysteresis armature of the rotor to produce the starting torque and also forming a plurality of pairs of salient pole pieces for magnetic coaction with the permanent poles formed by the synchronizing armature of the rotor to cause the rotor to lock-in-step with the pulsations of the current source.

The realization of the principal objects indicated in the foregoing paragraphs results in simplified parts which may be easily fabricated and assembled to form a novel low cost slow-running synchronous motor having relatively low current consumption for a given power output and producing in efficient manner both self-starting and synchronous torque.

The various objects and features, including the principal objects mentioned above, will be brought out in the detailed description which is rendered below with reference to the accompanying drawings showing in diagrammatic representation an embodiment of the invention. In these drawings, Fig. 1 shows a diagrammatic elevational front view of an embodiment of a motor made in accordance with the principles of the invention;

Fig. 2 is an elevational rear view of the motor shown in Fig. 1;

Fig. 3 illustrates the front view of the pole piece and field coil assembly as seen after removal of the rotor;

Fig. 4 is a side view of the field coil and pole piece assembly, as seen from the right when looking in the direction of the arrows 4—4 in Fig. 3;

Fig. 5 represents a side view of the motor as seen from the right when looking in the direction of the arrows 5—5 in Fig. 1;

Fig. 6 shows a view of the motor as seen when looking in the direction of the arrows 6—6 in Fig. 1;

Fig. 7 is an enlarged sectional view of the motor taken approximately along lines 7—7 in Figs. 1 and 2, illustrating particularly the coaction between the synchronizing armature and its associated salient pole pieces;

Fig. 8 represents, on the scale of Fig. 7, a sectional view taken approximately along lines 8—8 in Figs. 1 and 2, to aid in explaining the coaction between the starting or hysteresis armature and its associated salient pole pieces;

Fig. 9 shows a cross-sectional view of a modified rotor;

Fig. 10 is an exploded view of parts employed in magnetizing the synchronizing armature to form thereon a predetermined plurality of permanent poles; and Figs. 11 and 12 show a strip or band member having transversely beveled dovetailed ends adapted to interlock and to form a circular structure constituting the synchronizing armature of the previously noted figures.

Like parts are numbered alike throughout the drawings. Known elements and functions will be referred to only to the extent required for conveying an understanding of the invention.

The new motor is shown in the drawings as such, without a housing and supporting means and without the elements which constitute the driven mechanism or device. It is clear, of course, that a suitable housing as well as supporting or mounting means may be provided as desired. The driven mechanism may be a gear train for controlling a timing device, for example, an electric clock. It will be understood that an electric clock is mentioned only for the purpose of giving an example. The new motor will be found useful for controlling a variety of other devices requiring a drive control which is in definite predetermined timed relation with the pulsations of a suitable alternating current source.

Referring now to the drawings: Numeral 11 (Figs. 7 and 8) indicates a tubular core made of suitable magnetic steel. The opposite ends of this core are reduced, as shown at 12—13, to form shoulders for supporting the front and rear field members 14—15, respectively. These members are shown in the form of punched integral plates or disks made of suitable magnetic material. Laminated members may, of course, be used.

The front field member 14 is provided with a radially extending arm (see Fig. 3) having a cutout to form the inner pole pieces 16—17, and a radially extending arm 18 which is bent to form an axially rearwardly directed inner pole piece 19. The rear field member 15 (see Fig. 2) is a similar disk or plate having a radially extending arm or portion 20 which is slotted as indicated at 21, to form two arms or portions each of which is bent to form axially forwardly extending outer pole pieces 22—23, respectively. From the field member 15 also extends an arm which is slotted to form the wings 24—25 each of which is bent to form axially forwardly extending outer pole pieces 26—27, respectively.

The outer pole pieces 26—27 are radially aligned with the inner pole pieces 16—17 (Figs. 2 and 3) but separated therefrom by an air gap. The inner pole piece 19 is aligned with part of the outer pole piece 22 (see Figs. 2 and 3) but separated therefrom in radial direction by an air gap. The radii of the outer ends of the inner pole pieces 16—17 and 19 are identical, and the radii of the outer pole pieces 22—23 and 26—27 are likewise identical.

The outer pole piece 22 is shaded by a copper member 30 which passes completely around it. The shading member may be a solid piece of copper or may consist of a number of individual copper plates, as shown, which are pressed in place on the pole piece 22.

We thus have two distinct groups of salient pole pieces, namely, the group comprising the outer pole pieces 22—23 extending axially forwardly from the rear field disk 15, coacting magnetically with the inner pole piece 19 which extends rearwardly from the front field disk 14, and the group comprising the inner pole pieces 16—17 extending radially from the front field disk 14 for magnetic coaction with the outer pole pieces 26—27 which extend forwardly from the rear field disk 15. The group of coacting pole pieces 19, 22, 23 is used for starting the rotation of the rotor, and the group of coacting pole pieces 16—17 and 26—27 is used to lock the rotating rotor in synchronism with the pulsations of the alternating current source. Either or both groups may provide for one or more pairs of pole pieces.

Disposed between the field disks 14—15 is the field coil or winding 32, as shown in Figs. 7 and 8. In a practical embodiment this winding consisted of 5000 turns of No. 39 gage copper wire. It is understood that these data are given only to furnish an example. The number of turns of wire and the type of wire used for the field coil will always depend on the use to which the motor is to be put. The field winding may be provided on a suitable spool having the tubular portion 33 and the flanges 34—35. Conductors 36—37, shown in Figs. 4 and 5, are provided for connecting the field coil 32 with a suitable current source, e. g., a source supplying 60-cycle current at 110-volts.

Assuming that the motor is used for driving an electric clock, the field coil noted by way of example will consume 1 watt which is appreciably lower than the current consumption of synchronous motors used at the present time for operating electric clocks. The current consumption can be further reduced if the field disks 14—15 with their pole pieces are made of laminated material.

The core 11 is axially recessed at each end for the purpose of holding the rotor bearings 40—41 shown in Figs. 7 and 8. These bearings may be made of any desired and suitable material. Lubricant may be inserted into the channel 42 which extends axially between the bearings 40—41.

The rotor of the structure comprises a shaft 43 journalled in the bearings 40—41 and carrying at one end the pinion 44 for driving engagement with a suitable gear train associated with the driven mechanism. Secured to the other end of the shaft 43 is the rotor body which is made of lightweight material such, for example, as aluminum.

In the example shown, the rotor is a cuplike member having the radially extending front wall 45 and the axially directed flange 46. If desired, the front wall may be provided with suitable cutouts to form a spider. Suitably secured to the flange 46 is the starting or hysteresis armature 47 and the synchronizing armature 48. The flange 46 with its armatures 47—48 is disposed in the radial gap between the groups of salient pole pieces 16/17—26/27 and 19/22—23, respectively.

The starting or hysteresis armature 47 is made of hardened steel wire, e. g., so-called piano wire, which is tightly wound to form a tubular member for attachment to the rotor flange 46. A hardened steel band or strip may be used. The wire structure is preferred, to avoid a welding operation which would otherwise be necessary to join the free ends of a steel band or strip, thus preventing the formation of a permanent pole at the juncture point. The armature 47 reacts magnetically with the group of pole pieces 19/22—23 to supply starting and running torque.

The synchronizing armature 48, in the example shown, is made of a band or strip of material of high magnetic retentivity which is magnetized to produce a predetermined number of permanent circumferentially distributed poles arranged so as to form alternately different polarities. It is assumed that twenty such permanent magnets or poles are provided on the armature 48, as indicated by the transversely shaded portions shown on the armature 48 in Figs. 5 and 6. The synchronizing armature 48 reacts magnetically with the group of salient pole pieces 16/17—26/27 to lock the rotor at predetermined speed in step with the pulsations of the current source. The magnetic reaction between these pole pieces and the synchronizing armature is also believed to assist in producing the synchronous torque.

Among the materials which are adapted for making the synchronizing armature 48 are alloys marketed by the General Electric Company, known as "Cunife" which is composed of copper, nickel and iron; "Cunico" which is composed of copper, nickel and cobalt; and "Silmanal" which is composed of silver, manganese and aluminum. "Cunico" is preferably used. It is malleable, can be readily machined, punched, cast or rolled, and takes solder readily.

A strip of the material selected, for example, "Cunico," is circularly shaped and its abutting ends are soldered together to form the tubular structure for attachment to the flange 46 of the rotor.

It may be desirable to shape the free ends of the strip or band so as to form dovetails, as shown in Figs. 11 and 12. Numeral 48 in these figures designates the strip. One end is shaped to form the dovetail 50 and the other is shaped to form the dovetail recess 51. The walls of the dovetail 50 are beveled transversely to converge in a direction extending generally perpendicularly downwardly from the plane of the drawing, and the walls of the dovetail recess 51 are transversely beveled in opposite direction. Accordingly, when the strip or band is circularly formed and the dovetail 50 is inserted into the recess 51, the ends will interlock and secure the structure against longitudinal as well as transverse, that is, radial, displacement. The interlocking ends of the band may again be soldered together.

The method of magnetizing the strip or band forming the synchronizing armature may be explained with reference to Fig. 10. Numeral 48 indicates the strip or band to be magnetized. Numeral 52 is a steel plate provided with a circular opening 53 having a diameter which corresponds to the outside diameter of the circular strip 48. Numeral 54 is a steel disk having a diameter which corresponds to the inside diameter of the circular strip 48. The thickness of the plate 52 and of the disk 54 corresponds approximately to the width of the strip 48. Both the plate 52 and the disk 54 are provided with circularly arranged holes of equal number, e. g., with twenty equally spaced holes, as shown, corresponding to the number of permanent poles or magnets to be provided on the armature strip 48.

The strip is inserted into the opening 53 of the plate 52, and the disk 54 is then inserted into the strip 48. Care must be taken that the holes in the disk 54 are radially aligned with corresponding holes in the plate 52, and that the juncture point where the free ends of the strip 48 are joined is radially in alignment with two corresponding holes in the plate 52 and disk 54. A suitable wire, e. g., a copper wire, is then successively threaded through the holes in the plate 52 and then similarly threaded through the holes in the disk 54. The direction of threading the wire through any one hole in the plate 52 must coincide with the direction of threading it through the corresponding hole in the disk 54. The free ends of the wire, threaded in this manner through the holes in the plate 52 and disk 54, are then connected with a condenser which is charged by a suitable transformer to provide a discharge surge of sufficient magnitude to effect the magnetizing of the circular strip 48 so as to provide thereon the magnetized areas which form the twenty permanent magnets or poles. Adjacent poles on the strip have different polarities, due to the manner of directionally threading the energizing wire through the holes provided in the plate 52 and disk 54.

The armature 48 may be cut from tubular stock, thus eliminating the shaping and joining operation. The described procedure and method are employed in view of the relative availability of the material in strip form and in view of the lower costs of strip material as compared with tubular stock.

When the field coil 32 of the motor, composed of the parts as shown and described in the foregoing, is connected to a 110-volt, 60-cycle current source, the rotor 45—46 will rotate in the direction of the arrow, as marked in Figs. 1 and 2. The rotor quickly accelerates and locks-in-step with the pulsations of the current source at 180 R. P. M. This synchronous speed is appreciably slower than the synchronous speeds of previously known motors of the same general class, thus simplifying the design of the driven gear train. The structure and arrangement of parts, as shown and described, furnishes a synchronous motor having sufficient torque to make it self-starting and sufficient synchronous torque for the operation of an electric clock.

The theory of operation of the new motor is not definitely known but is assumed to be as follows:

When the field coil 32 is energized with alternating current, for example, 110-volt, 60-cycle current, an alternating field is produced in the salient poles 19, 22 and 23. The unshaded poles 19 and 23 are oppositely polarized by the current and their polarity alternates in synchronism with the current source. The shaded pole 22, due to the continuous conductive path provided by the copper member 30, produces a phase-shifting effect, and the instantaneous flux in the shaded pole 22 therefore lags in time-phase relationship behind that in the unshaded pole 23. The result is a rotating magnetic field which reacts with the starting or hysteresis armature 47 to produce the torque which starts the rotation of the armature and therewith the rotor in the direction of the arrows indicated in Figs. 1 and 2. The flux density, which in part affects the magnitude of the rotating field, is determined by the width of the pole pieces 19, 22 and 23 and by the angular relationship of the pole piece 19 with respect to the pole pieces 22 and 23, the pole piece 19, as seen in the direction of rotation of the rotor, extending angularly beyond the trailing edge of the pole piece 22. The rotor accelerates quickly and, upon approaching synchronous speed it locks-in-step with the pulsations of the current source at 180 R. P. M. by the reaction of the alternating magnetic field set up between the salient pole pieces 16—17 and 26—27 with the permanent poles of alternately opposite polarity carried by the synchronizing armature 48. These permanent poles are believed to react with the polarities of the salient pole pieces in a prompting or orienting manner which prevents acceleration beyond the synchronous speed and maintains the rotor at synchronous speed.

The synchronous torque may be produced by the reaction between the starting armature 47 and its associated salient pole pieces, but is believed to be a function, jointly, of the reaction between the starting armature 47 and the salient poles 19, 22 and 23 and by the reaction between the salient poles 16—17 and 26—27 and the synchronizing armature 48. The production of the synchronous torque is believed to be effected by the angular relationship which obtains between the two groups of salient pole pieces and by the angular relationship which obtains between the permanent poles on the synchronizing armature 48 and the associated group of salient pole pieces 16—17 and 26—27. The angular relationship of the latter pole pieces with respect to the pole pieces coating with a hysteresis armature 47 may be such that the starting as well as the synchronous torque is furnished exclusively by the group of pole pieces which react with the hysteresis armature.

Modifications may be made, some of which are briefly indicated below:

The rotor may be modified as shown in Fig. 9. A cuplike member made of suitable material, e. g., a suitable plastic material such as Bakelite, may be provided, having a front wall 45a and an axial flange 46a. Molded into the flange 46a, inside thereof, may be the starting or hysteresis armature 47a, consisting of a piano wire coil, as described before, for reaction with the corresponding salient pole pieces to provide the starting torque. The synchronizing armature 48a is again a circular strip or band magnetized to provide a predetermined number of permanent poles, as described before, and placed on the side wall 46a of the rotor in engagement with a shoulder formed thereon, as shown. The shaft 43a may be provided with an enlargement molded into the front wall 45a centrally thereof. The front wall may, of course, be provided with radial cutouts to form a spider.

The pinion 44 may be secured to the rotor shaft 43 or 43a, respectively, either as shown in the drawings, Figs. 5, 6, 7 and 8, or the shaft may extend axially beyond the rotor for attachment of a pinion such as 44. The motor may thus be used as a driving device for a gear train independent of the physical location of the gear train with respect to the rotor.

The magnetic forces acting on the rotor tend to pull the rotor in axial direction into its running position. This feature may be employed when it is desired to actuate certain control means, for example, circuit contacts, incident to the starting of the rotor.

The magnetized areas on the synchronizing armature 48 constitute, in effect, individual permanent magnets which are circumferentially distributed on the rotor body. If desired, individual pieces, each forming a permanent magnet, may be secured to the rotor. This may be done by providing suitable cutouts or slots in the front wall 45 of the rotor near the periphery thereof, terminating in axial direction in back of the inside of the flange 46, the number of such slots corresponding to the number of poles or magnets to be secured to the rotor. Each individual magnet may be made of a small strip of suitable magnetic material bent upon itself in U-shape and secured to the flange in the manner of a clamp, its legs pointing axially rearwardly, one extending on the outside and the other extending through the corresponding slot in the rotor rearwardly into engagement with the inside wall of the flange 46. These individual pieces may be magnetized prior to attaching them to the rotor, as noted, or they may be attached before magnetizing and may be magnetized in common in a suitable jig so as to form poles of alternately different polarities. The magnetizing in such a jig may be carried out generally analogous to the manner of magnetizing the armature strip as described with reference to Fig. 10.

Instead of providing a solid strip of high magnetic retentivity to form the synchronizing armature 48 or 48a, respectively, as described, it is possible to employ a wire of suitable magnetic material and coil it in a similar manner as the piano wire is used to form the hysteresis armature 47 or 47a, respectively. In this case the material previously mentioned, known as "Cunife," may be advantageously employed because such material may be made in the form of wire which is so ductile that it can be formed into a coiled spring.

The coacting salient pole pieces 16—26 and 17—27 may be arranged in radial alignment, as shown. It is possible, however, to displace the pole pieces 16—17 angularly with respect to the pole pieces 26—27 so that they either lag behind or lead the latter, as viewed in the direction of rotation of the rotor.

Each group of salient poles reacting with the hysteresis and with the synchronizing armatures, respectively, may have a desired number of pairs of pole pieces, depending on the effect that is to be produced for any particular use of the motor.

The synchronous speed of 180 R. P. M. is determined, as described, by the number of permanent poles carried by the synchronizing armature 48 in magnetic reaction with the associated group of pole pieces 16—17 and 26—27. Higher or lower synchronous speeds may be obtained as desired, by providing a synchronizing armature carrying a smaller or a greater number of permanent poles, respectively. For example, if the armature is provided with ten permanent poles instead of twenty, as described, the synchronous speed will be 360 R. P. M., and if there are forty permanent poles the speed will be 90 R. P. M. The invention therefore furnishes basically a synchronous motor adapted to furnish a desired synchronous speed. It is understood, of course, that the salient poles reacting with the permanent poles of the synchronizing armature must be angularly arranged analogous to the arrangement shown in the drawings, so as to react properly with the permanent poles forming such armature.

The principles underlying the invention may be employed in providing synchronous motors for a variety of purposes aside from driving electric clocks. Various timing devices furnish obvious examples of different applications but do not exhaust the possibilities. The principles of the invention may be advantageously employed in the construction of low-speed synchronous motors having considerably greater starting and synchronous torque than the torque that is required for driving electric clocks, for example, in the construction of motors for directly driving sound-reproducing devices such as record players and the like. The required relatively greater starting and synchronous torques may be obtained by increasing the dimensions of the magnetic field members and their salient poles as well as the corresponding dimensions of the rotor, and by the provision of a greater number of magnetically coacting salient poles in each group of pole pieces. The desired low synchronous speed may again be obtained by providing an appropriate number of permanent poles on the synchronizing armature.

The rotor member made of material of high magnetic retentivity and magnetized to form a desired number of permanent poles, as used in the present case for the synchronizing armature, will be found useful in electrical machinery other than synchronous motors, that is, in general, in many instances where magnetic inductance or reaction between moving and stationary poles is to be utilized for producing a desired effect. Numerous such instances will occur to those experienced in the art.

It will be seen, in view of the foregoing discussion, that changes are possible within the scope and spirit of the following claims which define what is believed to be new and desired to have protected by Letters Patent of the United States.

I claim:

1. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece being angularly displaced with respect to the second pair of outer pole pieces and forming a radial air gap therewith which is axially displaced with respect to the air gap formed by the pole pieces of the first group, and a rotor carrying two distinct armatures, one for reaction with each group of pole pieces within the air gap formed thereby.

2. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the plate-like field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the plate-like field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby.

3. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the plate-like field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the plate-like field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole pieces forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, said rotor comprising a generally cup-shaped carrier on which said armatures are disposed in axially spaced relationship.

4. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, said rotor comprising a generally cup-shaped carrier on which said armatures are disposed in axially spaced relationship, one of said armatures being made of a band of material of high magnetic retentivity and forming a predetermined number of permanent poles and the other armature being made of a plurality of turns of steel wire placed side by side on said carrier.

5. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally from the platelike field element carying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, said rotor comprising a generally cup-shaped carrier on which said armatures are disposed in axially spaced relationship, a plurality of circumferentially distributed magnets constituting one of said armatures and magnetically circumferentially continuous means constituting the other armature.

6. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, said rotor comprising a generally cup-shaped carrier on which said armatures are disposed in axially spaced relationship, one of said armatures being formed in the manner of an endless circular band made of an alloy of the class including alloys known as "Cunife"—"Cunico"—or "Silmanal," respectively, said band being magnetized to form a plurality of circumferentially distributed magnets.

7. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with one of said group of pole pieces to start rotation of said rotor and one for reaction with the other group of pole pieces to lock the rotating rotor in synchronism with an alternating current source.

8. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the plate-like field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the plate-like field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, said rotor comprising a generally cup-shaped molded casing, a member molded into said casing and forming one of said armatures, and means forming a plurality of permanent poles secured to said casing to form the other armature.

9. A synchronous motor comprising a core carrying an energizing coil, a platelike field element of magnetic material disposed at each end of said core and radially extending therefrom, said platelike field elements forming two distinct groups of peripherally disposed pole pieces, the pole pieces of the first of said groups being formed by a first pair of outer pole pieces carried by and axially inwardly extending from a corresponding pair of arms which project peripherally outwardly from the platelike field element at one end of said core and by a coacting pair of inner pole pieces carried by and peripherally projecting from the platelike field element at the other end of said core, said inner pole pieces being angularly aligned with said first pair of outer pole pieces and forming a radial air gap therewith, the pole pieces of the second group being formed by a second pair of outer pole pieces carried by and axially inwardly extending from a corresponding pair of arms which project peripherally from the platelike field element carrying said first pair of outer pole pieces of said first group and by an inner pole piece carried by and axially inwardly extending from an arm which projects peripherally from the platelike field element carrying said pair of inner pole pieces which coact with the first pair of outer pole pieces of said first group, said inner pole piece forming a radial air gap with one of the outer pole pieces of said second group which is axially displaced with respect to the air gap formed by the pole pieces of the first group, and a rotor carrying two distinct armatures, one for reaction with each group of pole pieces within the air gap formed thereby, one of said armatures consisting of a plurality of turns of steel wire and constituting a hysteresis armature for reaction with the second group of pole pieces to start rotation of said rotor and the other armature consisting of a plurality of turns of wire made of an alloy of high magnetic retentivity and constituting a synchronizing armature for reaction with the first group of pole pieces to lock said rotor in synchronism with an alternating current source.

WILLARD J. REID.

REFERENCES CITED

The following references are of record in the file of this patent:

UNITED STATES PATENTS

| Number | Name | Date |
| --- | --- | --- |
| 1,985,091 | Haigis | Dec. 18, 1934 |
| 2,237,960 | Hansen et al. | Apr. 8, 1941 |
| 2,374,347 | Hansen et al. | Apr. 24, 1945 |
| 2,445,813 | Walworth | July 27, 1948 |
| 2,455,134 | Mungall | Nov. 30, 1948 |

FOREIGN PATENTS

| Number | Country | Date |
| --- | --- | --- |
| 436,145 | Great Britain | Oct. 7, 1935 |